Figure 1:
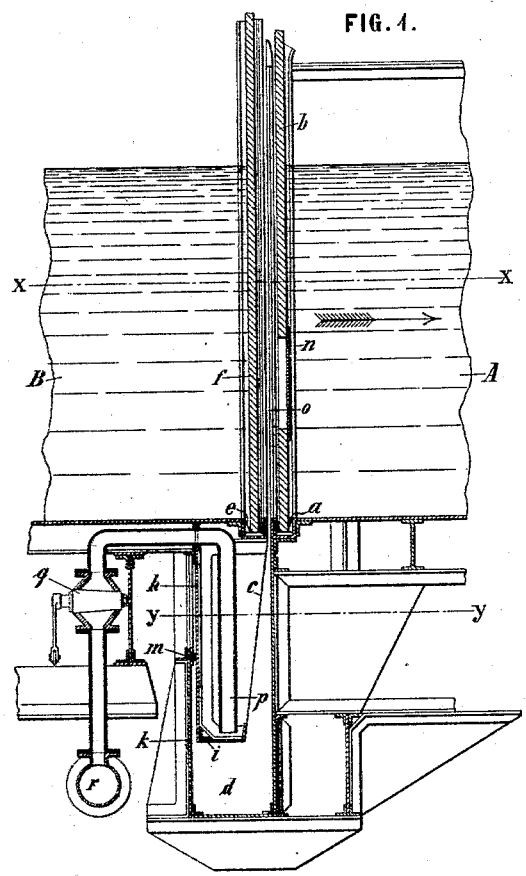

(No Model.) 3 Sheets—Sheet 1.

H. LUBOWSKI.
WATER TIGHT JOINT FOR CANAL LIFTS.

No. 561,902. Patented June 9, 1896.

Witnesses.
Walter E. Allen.
E. Q. Knight.

Inventor.
Hermann Lubowski.
By Knight Bros
Attorneys.

(No Model.) 3 Sheets—Sheet 2.
H. LUBOWSKI.
WATER TIGHT JOINT FOR CANAL LIFTS.
No. 561,902. Patented June 9, 1896.
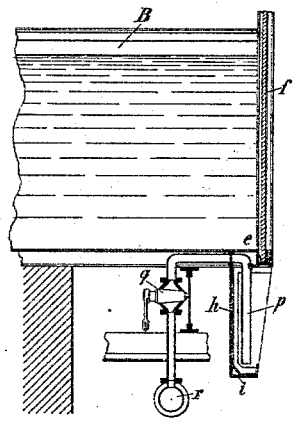
FIG. 1ª
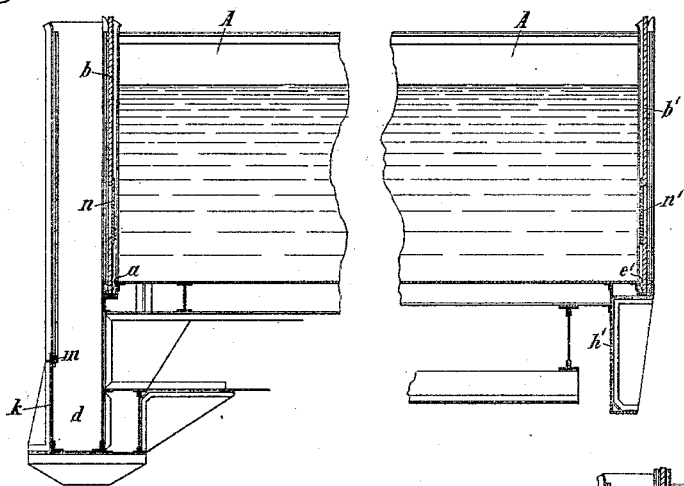
FIG. 1ᵇ   FIG. 4ª
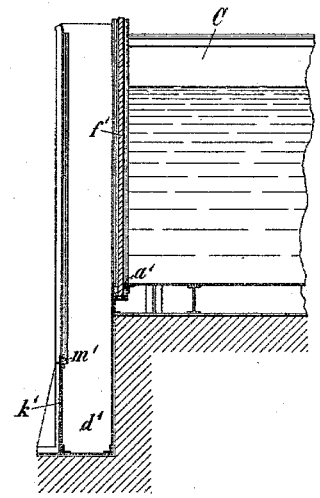
FIG. 4ᵇ
Witnesses.
Walter E. Allen.
E. Q. Knight.
Inventor.
Hermann Lubowski.
By Knight Bros
Attorneys.

(No Model.) 3 Sheets—Sheet 3.
H. LUBOWSKI.
WATER TIGHT JOINT FOR CANAL LIFTS.
No. 561,902. Patented June 9, 1896.

Witnesses.
Walter E. Allen
E. Q. Knight.

Inventor.
Hermann Lubowski.
By Knight Bros.
Attorneys.

UNITED STATES PATENT OFFICE.

HERMANN LUBOWSKI, OF MAGDEBURG, GERMANY, ASSIGNOR TO FRIED. KRUPP GRUSONWERK, OF SAME PLACE.

WATER-TIGHT JOINT FOR CANAL-LIFTS.

SPECIFICATION forming part of Letters Patent No. 561,902, dated June 9, 1896.

Application filed December 17, 1894. Serial No. 532,101. (No model.) Patented in Germany December 24, 1893, No. 78,214; in Belgium July 12, 1894, No. 110,949, and in England October 3, 1894, No. 18,758.

*To all whom it may concern:*

Be it known that I, HERMANN LUBOWSKI, a subject of the King of Prussia, Emperor of Germany, and a resident of Magdeburg, in the Kingdom of Prussia, German Empire, have invented certain new and useful Improvements in and Relating to Water-Tight Joints for Canal-Lifts, (patented in Belgium, No. 110,949, dated July 12, 1894; in Germany, No. 78,214, dated December 24, 1893, and in Great Britain, No. 18,758, dated October 3, 1894,) of which the following is a specification.

This invention relates to canal-lifts, and has for its object to provide a reliable, simple, and automatic water-tight joint between the trough or caisson and the upper and lower branches of the canal. Use is made for this purpose of the hydrostatic pressure which the contents of the trough exert upon the stop-gates of the same. This pressure acts equally upon the inner sides of the two gates and therefore the latter are pressed toward the flanges of the trough so long as they are closed and not subject to pressure on the outside. If, however, one end of the trough is joined to a branch of the canal and if the space between the gate adjoining such end and that of the canal is filled with water, the said trough-gate will be subject to outer pressure and therefore be in equilibrium, while the pressure acting upon the inner side of the gate at the free end of the trough will then tend to move the trough in its longitudinal direction away from the canal branch. This tendency, which exists when the gate is opened at the joined end of the trough, has been opposed in canal-lifts heretofore known and constructed by forcing the trough against the canal branch to maintain the joint between the trough and the canal.

With the device forming the subject of the present invention the one-sided hydrostatic pressure upon the gate at the free end of the trough is not balanced by a counter-pressure, but is utilized for effecting the automatic formation of a water-tight joint between the trough and the canal by pressing the bearing-surfaces of the joint against each other. The manner of obtaining this water-tight joint will be seen from the constructional example represented in the accompanying drawings, provision being made in this example for the automatic formation of a water-tight joint also when changes in the level of the water in the canal require the adjustment of the trough to different heights.

Figure 4:
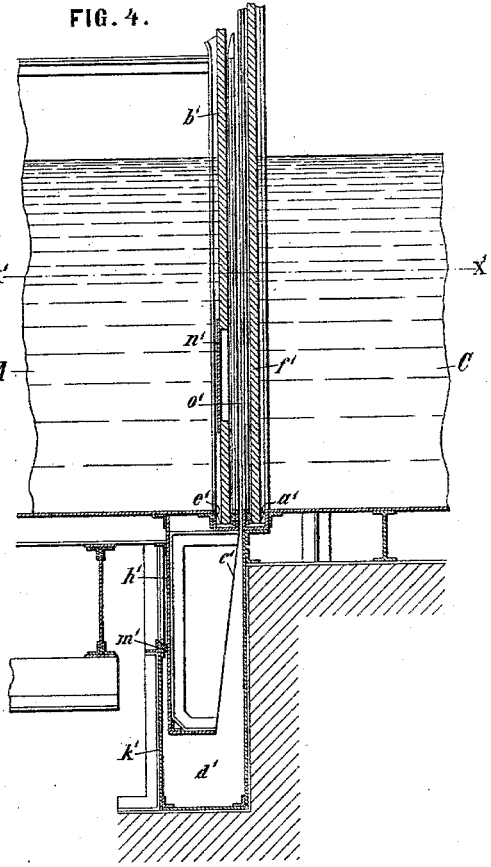
Figure 2:
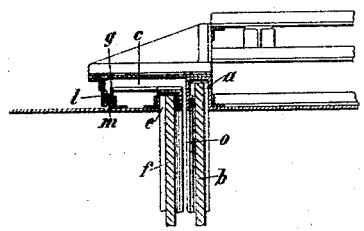
Figure 5:
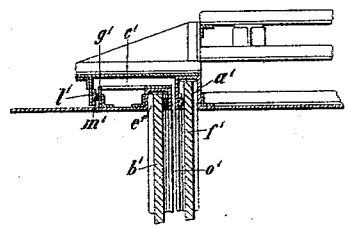
Figure 3:
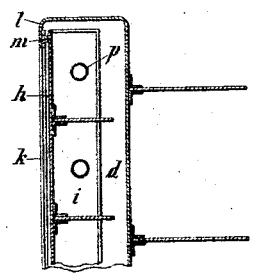
Figure 6:
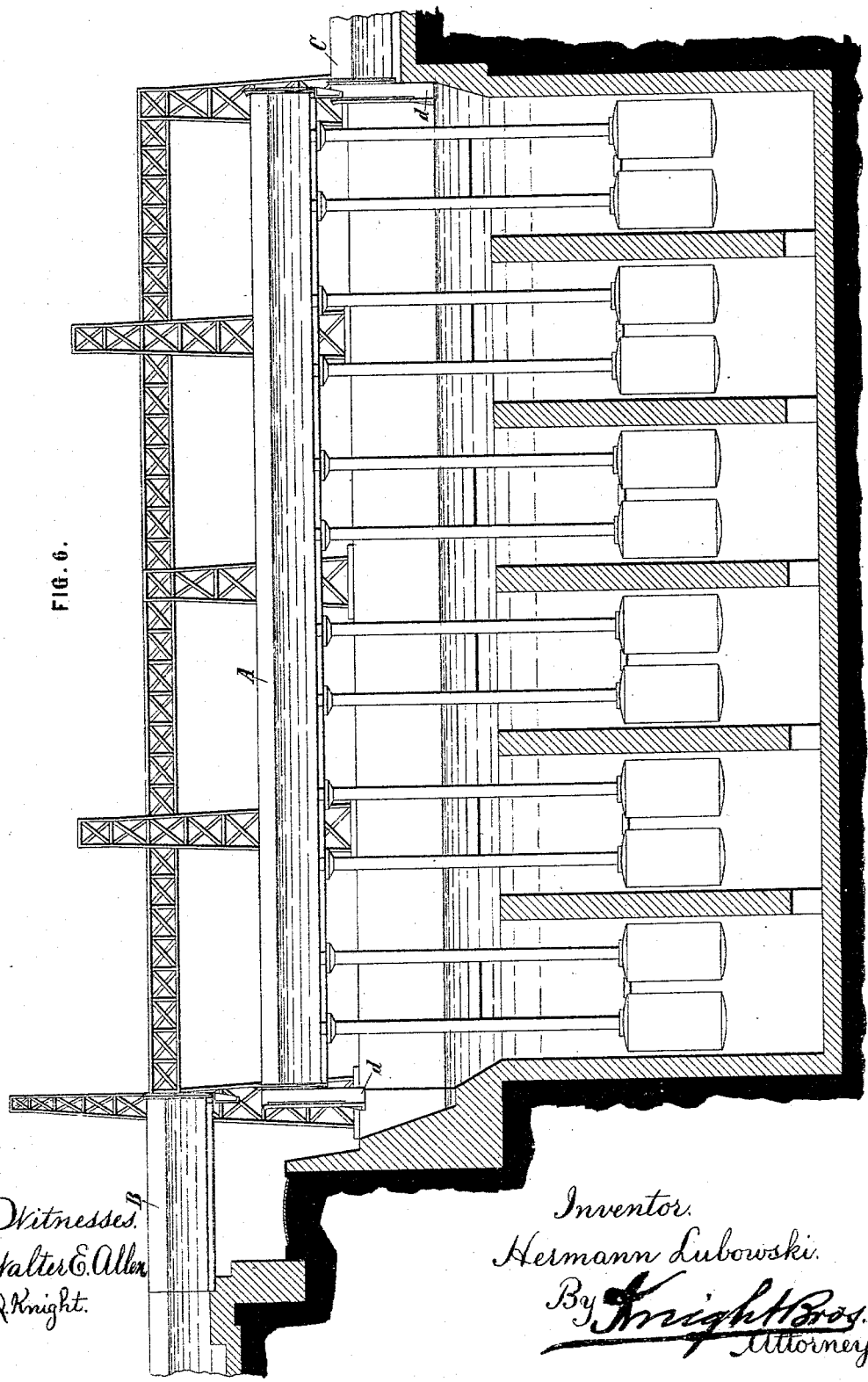

Figures 1 to 3, Sheet 1, represent the arrangement for the upper branch of the canal and the trough end joined to the latter in longitudinal section and in two horizontal sections taken on the lines $x\ x$ and $y\ y$, respectively, of Fig. 1. Figs. 4 and 5 illustrate the arrangement for the lower canal branch and the corresponding joined trough end in longitudinal section and in a horizontal section taken on the line $x'\ x'$ of Fig. 4. Figs. 1$^a$ 1$^b$ and 4$^a$ 4$^b$, Sheet 2, represent the canal branches and trough ends lying free with closed gates; and Fig. 6, Sheet 3, is a general view of the arrangement with the trough at an intermediate level.

As shown in Figs. 1 and 2, to the rabbet $a$ for the gate $b$ of the trough A, situated on the side of the upper branch and with which the trough is otherwise ordinarily flush, is joined a second rabbet $c$, which is extended below the trough to form a deep chamber $d$ and embraces the rabbet $e$ for the gate $f$ of the upper branch B and a flange $g$ projecting behind the same from the side walls and the bottom of the upper branch. This flange is extended laterally at the bottom of the upper branch to form a wall $h$, the lower part $i$ of which is bent round to a ∪-shaped form. The outer wall $k$ of the chamber $d$ passes behind the wall $h$, and the continuations of the said wall $k$ on both sides of the upper branch—viz., the narrow flanges $l$—pass behind the flanges $g$. The flanges $l$ and the upper edge of the wall $k$ are provided on their inner side with an india-rubber jointing-strip $m$. During the last part of the upward movement of the trough the latter is so guided that the india-rubber strip $m$ is maintained at a short distance from the outer side of the wall $h$ and the flanges $g$ in order that it may not slide thereupon, and only just before its stoppage is the trough displaced by its guide in the direction of the arrow to such an extent that the packing-strip $m$ is slightly pressed against the flange $g$. According as the level of the water in the upper branch of the canal varies so will the height at which the trough is brought to rest, and the horizontal part of the strip $m$ will bear either, as shown, against the middle of the wall $h$ or above or below the middle. After the trough is stopped the slide $n$ in the trough-gate $b$ is opened, and water is admitted to the space $o$ between the gates $f$ and $b$ and to the rabbet $c$ and its chamber $d$. The slide $n$ may be situated in the gate $f$. By this means the gates $b$ and $f$, hitherto loaded only by a water-pressure on one side and pressed against their joint faces, are placed in equilibrium of pressure, so that only their own weight has to be overcome when they are raised in order to allow the passage of a boat. The pressure upon the inner side of the other gate of the trough at the free end of the same, however, continues to operate (in the constructional example represented in the drawings it is even aided by a pressure corresponding to the difference in the surfaces between the inner wall and outer wall of the chamber $d$) and tends to move the trough in the direction of the arrow. By this means it presses the wall $k$ and the flanges $l$, furnished with the packing-strips $m$, against the wall $h$ and the flanges $g$, so that an automatic tightening of the joint between the trough and the upper branch of the canal is obtained. As the trough is always filled to about the same level, the aforesaid pressure, which has a tightening effect on the joint, will always be the same, and by suitably choosing the breadth of the india-rubber strip $m$ it is possible that exactly such pressure will be brought to bear upon the unit of surface of the strip as is most favorable for producing a tight joint.

Prior to the downward movement of the trough it is needful to lower the gates $b$ and $f$, to close the slide $n$, and to run off the water contained in the space $o$ between the gates, in the rabbet $c$, and in the chamber $d$, in the first place for the gates $b$ and $f$ to again receive water-pressure on one side only to make a tight joint before the trough is set in motion, and in the second place in order that after breaking the joint at $m$ the water may not flow downward. The water contained in the chamber $d$ need only be drawn off down to the level of the upper edge of the wall $k$, the remainder being then moved down and up again with the trough. As, however, the upper edge of the wall $k$ is sometimes higher and sometimes lower than the position shown, according as the trough is raised more or less to accommodate it to the varying level of the water in the canal, it is advisable to effect the running off of the water to a lower level than the top of the wall $k$. This is done by siphon-tubes $p$. Each of the tubes $p$ is provided with a cock $q$ or other closing device in its longer branch, with which it terminates in a common discharge-pipe $r$ for all the tubes.

The lower trough-shaped edge $i$ of the wall $k$ forms a channel in which the water cannot sink below the lower edge of the open branch of each siphon-tube $p$, so that this branch is always closed by water and its water does not flow out into the chamber $d$ when the trough moves down.

When the water is to be run off from the spaces $o$ and $c$, the cocks $q$, which are preferably connected with each other, are opened. The water then flows through the tubes $p$ into the pipe $r$ until its level in the chamber $d$ has sunk to the level of the open end of the tubes $p$. The pressure upon the trough in the direction of the arrow then no longer exists, and at the commencement of the downward movement the trough is moved by its guide a few millimeters in the opposite direction to the arrow, whereby the joint is broken, and in the continued downward movement the jointing-strip cannot slide upon the wall $h$.

The cocks $q$ are closed again prior to the downward movement of the trough, so that the open branches of the siphon-tubes $p$ remain filled with water.

In the next upward movement of the trough the chamber $d$ again raises the water which it had taken down with it. The cocks $q$ are not opened again until the gates $b$ and $f$ and the slide $n$ for the next downward movement are closed.

The height of the walls $h$ and $k$ depends on the difference between the highest and lowest water-level in the upper branch of the canal in which boats are to pass. If the arrangement is such that the level of the water remains always the same, the walls $h$ and $k$ need only be of such a height that the siphon-tubes $p$ find room below the bottom of the upper branch of the canal, and the chamber $d$ then shrinks to a rabbet.

The joint between the trough and the lower branch of the canal, as shown in Figs. 4 and 5, is obtained by a somewhat different arrangement. Here the trough end does not embrace the canal branch, but the reverse is the case, because the trough passes in from above. The vertical wall $h'$, with the flanges $g'$ projecting from the sides here, belongs to the trough, while the lower branch of the canal is provided with the rabbet $c'$ and the chamber $d'$. Otherwise the arrangement and mode of operation are the same as above described, only the drawing off of the water from the intermediate spaces causes less trouble, because the chamber $d'$ being secured to the lower branch the water can flow off from it downward. As hereinabove set forth, the water-tight joint is made at the upper branch and also at the lower branch by the hydrostatic pressure automatically, and the use of the deepening of the lower rabbet is independent of the level of the water in the canal.

Having described this invention, what I claim, and desire to secure by Letters Patent, is—

1. The combination of the upper branch provided with a gate, a flange projecting outwardly from the wall of the upper branch, a trough provided with gates, a flange projecting inwardly from the wall of the trough, and means for admitting water into the space between the adjacent gates to cause the flange of the trough to bear against the flange of the upper branch before as well as after the adjacent gates are opened; substantially as described.

2. The combination of the lower branch provided with a gate, a flange projecting inwardly from the wall of the lower branch, a trough provided with gates, a flange projecting outwardly from the wall of the trough, and means for admitting water into the space between the adjacent gates to cause the flange of the trough to bear against the flange of the lower branch before as well as after the adjacent gates are opened; substantially as described.

3. The combination of the upper branch provided with a gate, a flange projecting outwardly from the wall of the upper branch and a trough provided with gates having openings, and slides controlling the openings, a flange projecting inwardly from the wall of the trough and adapted to bear against the flange of the upper branch when the slide of the trough-gate adjacent to the upper-branch gate is opened, and the adjacent gates are lifted; substantially as described.

4. The combination of the lower branch provided with a gate, a flange projecting inwardly from the wall of the lower branch, the trough provided with gates having openings and slides controlling the openings, and a flange projecting outwardly from the wall of the trough and adapted to bear against the flange of the lower branch when the slide of the trough-gate adjacent to the lower-branch gate is opened and the adjacent gates are lifted; substantially as described.

5. The combination of the upper branch provided with a gate, a flange projecting outwardly from the wall of the upper branch, a trough provided with gates having openings and slides controlling the openings, a flange projecting inwardly from the wall of the trough at one end of the latter and adapted to bear against the flange of the upper branch when the slide of the trough-gate adjacent to the upper-branch gate is opened and the gate of the upper branch and the adjacent gate are lifted, and the lower branch provided with a gate and having a flange projecting inwardly from the wall thereof, and the flange projecting outwardly from the wall of the trough and at the other end of the latter and adapted to bear against the flange of the lower branch when the slide of the trough-gate adjacent to the lower-branch gate is opened and the gate of the lower branch and the adjacent gate are opened; substantially as described.

6. The combination of the upper branch, a flange projecting outwardly from the wall of the upper branch, the pendent wall beneath the upper branch, the lower branch, a flange projecting inwardly from the wall of the lower branch, a chamber located beneath the flange of the lower branch, and the trough, a flange projecting inwardly at one end of the trough, a flange projecting outwardly at the other end of the trough, the chamber on the trough located beneath the pendent wall of the upper branch, and the pendent wall on the trough located over the chamber of the lower branch; substantially as described.

7. The combination of the upper branch, a pendent wall located beneath the upper branch, the trough, the chamber on the trough located beneath the pendent wall of the upper branch, and the siphon operating between the pendent wall and the chamber; substantially as described.

HERMANN LUBOWSKI.

Witnesses:
K. E. DETZNER,
EMIL KALLNECKER.